United States Patent
Niimi et al.

(10) Patent No.: US 7,472,586 B2
(45) Date of Patent: Jan. 6, 2009

(54) FLOW AMOUNT MEASURING DEVICE AND METHOD THEREFOR

(75) Inventors: Yoshihisa Niimi, Nagoya (JP); Seigi Toiyama, Okazaki (JP); Yosimi Saito, Mitaka (JP); Tatsuya Masai, Okazaki (JP)

(73) Assignees: Denso Corporation (JP); Tokyo Aircraft Instrument Co., Ltd. (JP)

( * ) Notice: Subject to any disclaimer, the term of this patent is extended or adjusted under 35 U.S.C. 154(b) by 311 days.

(21) Appl. No.: 11/259,358

(22) Filed: Oct. 27, 2005

(65) Prior Publication Data

US 2006/0101922 A1 May 18, 2006

(30) Foreign Application Priority Data

Oct. 27, 2004 (JP) .............................. 2004-312010

(51) Int. Cl.
*G01M 15/00* (2006.01)
(52) U.S. Cl. .................. 73/114.42; 73/114.48
(58) Field of Classification Search .................. 73/116, 73/117.2, 117.3, 118.1, 119 A, 114.38, 114.41, 73/114.42, 114.43, 114.45, 114.48, 114.51
See application file for complete search history.

(56) References Cited

U.S. PATENT DOCUMENTS

| | | | |
|---|---|---|---|
| 4,328,697 A | | 5/1982 | Tumber et al. |
| 5,553,490 A | * | 9/1996 | Nicholls et al. ........... 73/119 A |
| 5,795,998 A | * | 8/1998 | Smith ......................... 73/118.1 |
| 6,021,762 A | * | 2/2000 | Zeidler et al. ................ 123/509 |
| 6,513,371 B1 | * | 2/2003 | Jett et al. .................... 73/119 A |

FOREIGN PATENT DOCUMENTS

| | | |
|---|---|---|
| DE | 39 41 430 A1 | 6/1991 |
| FR | 2 707 003 A1 | 12/1994 |
| JP | 51-38777 | 9/1976 |

OTHER PUBLICATIONS

German Official Action dated Feb. 18, 2008, issued in corresponding DE Application No. 10 2005 051 293.3 with English translation.
German Examination Report dated Jul. 14, 2008, issued in corresponding German Applicaion No. 10 2005 051 293.3-52 with English translation.

* cited by examiner

*Primary Examiner*—Eric S McCall
(74) *Attorney, Agent, or Firm*—Nixon & Vanderhye PC (57) ABSTRACT

A measuring body is provided in a fluid path between a pump and a fuel injection valve, a flow amount for which is measured. An inner space of the measuring body is divided into a first and a second fluid chambers by a partitioning wall, wherein the first and second fluid chambers are, respectively, operatively connected to the pump and the fuel injection valve. A movable member (float) is slidably inserted into a through-hole formed in the partitioning wall, so that both ends are respectively exposed to the first and second fluid chambers. When the fuel injection is carried out by the fuel injection valve, the fluid in the second fluid chamber is decreased corresponding to the amount of injected fluid, and thereby the float is moved in a direction from the first to the second fluid chamber. The amount of the injected fluid is measured by detecting the movement of the float.

14 Claims, 8 Drawing Sheets

FLOW AMOUNT MEASURING DEVICE AND METHOD THEREFOR

CROSS REFERENCE TO RELATED APPLICATION

This application is based on and incorporates herein by reference Japanese patent application No. 2004-312010 filed on Oct. 27, 2004.

FIELD OF THE INVENTION

The present invention relates to a flow amount measuring device and a flow amount measuring method for measuring a flow amount of fluid injected by a fluid injection valve.

BACKGROUND OF THE INVENTION

A conventional flow amount measuring device for measuring a flow amount of fluid injected by a fluid injection valve is disclosed in Japanese Examined Utility Model Publication S51-38777. The flow amount measuring device therein utilizes a gear pump installed in a flow path of the fluid and a piston moving under a pressure difference of the fluid between an upstream side and a downstream side of the gear pump. The flow amount measuring device detects the location of the piston and rotates the gear pump by means of a motor so that the piston returns to a reference position. When the flow amount increases, the pressure difference becomes larger and the pump gear is rotated faster to bring back the piston to the reference position. Therefore, the flow amount measuring device can detect the flow amount according to the amount of rotation of the gear pump.

However, the rotation of the gear pump causes a pressure pulsation in the fluid which makes the position of the piston unstable. Therefore, the flow amount measuring device utilizing the rotation of the gear pump has difficulty in measuring the flow amount with a high degree of accuracy.

In addition, although the flow amount measuring device utilizing the rotation of the gear pump may be suitable for measuring a flow amount per unit time of fluid flowing continuously in the flow path, it has difficulty in measuring with a high degree of accuracy the flow amount of fluid injected by the fluid injection valve repeating the injection intermittently, such as a fuel injection valve for an internal combustion engine.

In addition, when the fluid injection valve starts the injection for the purpose of measuring the flow amount, there is a delay from a time, at which the pressure difference between the upstream and downstream side of the gear pump is detected, to a time at which the rotation of the gear pump driven by the motor reaches a rotational speed for canceling the pressure difference. Therefore, the amount of the rotation detected in the delay period does not represent a correct flow amount. In order to cope with the problem caused by the delay period, the measuring device may neglect the detected amount of rotation in the delay period, and uses the detected amount of rotation after a predetermined time period has passed by after the injection valve had started its injection. Otherwise, the number of injections, including the injections during the delay period, is increased to diminish the influence of the incorrectness caused by the delay time.

SUMMARY OF THE INVENTION

The present invention is made in view of the above problems. It is an object of the present invention to provide a flow amount measuring device and a flow amount measuring method in which a flow amount of fluid injected by a fluid injection valve can be measured in a short period and with a high degree of accuracy.

According to the present invention, a housing for a flow amount measuring device is provided in a fluid path for guiding injection fluid from a source of the injection fluid to a fluid injection valve. An inner space defined by the housing is divided by a partitioning wall into a first fluid chamber and a second fluid chamber. A movable member is slidably arranged in the partitioning wall so that the movable member can slide through the partitioning wall in both directions toward the first and second fluid chambers. When the fluid is supplied from the source of the injection fluid to one of the fluid chambers, the fluid is supplied from the other fluid chamber to the fluid injection valve. Therefore, when the fluid injection is carried out by the fluid injection valve, a pressure difference is generated between the first and second fluid chambers. The movable member is moved by the pressure difference.

The pressure difference between the first and second fluid chambers changes depending on the flow amount of the injection fluid injected by the fluid injection valve. Therefore, the movable member moves according to the flow amount. Thus, it becomes possible to measure the flow amount of the fluid injection valve with a high degree of accuracy, based on the amount of the movement of the movable member.

In other words, the amount of the movement is determined by a sum of amounts of the injections. Therefore, the flow amount is calculated with a high degree of accuracy even with a small number of injections. Thus, it becomes possible to reduce a time for the measurement of the flow amount.

Even if two different fluid injection valves inject the same amount of fluid by a large number (e.g. hundred times) of injections, they may inject the different amount of fluid by a small number of injections due to variations for each injection. Therefore, it becomes possible to measure the variations among fluid injection valves with a high degree of accuracy, because the injected fluid amount can be precisely measured by a small number of injections.

In the case that air is mixed in the first and/or second fluid chambers, the amount of the movement of the movable member may vary for the amount of the injection of the fluid injection valve, because the volume of the air changes depending on its temperature or pressure. According to the present invention, therefore, the air is discharged from the fluid chambers and the fluid chambers are filled with the fluid by opening an air vent valve for discharging the air from the fluid chambers. Thus, the variation for the amount of the movement of the movable member relative to the amount of the injection of the fluid injection valve can be suppressed and the flow amount can be measured with a high degree of accuracy, depending on the amount of the movement of the movable member.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE INVENTION

First Embodiment

Figure 1:
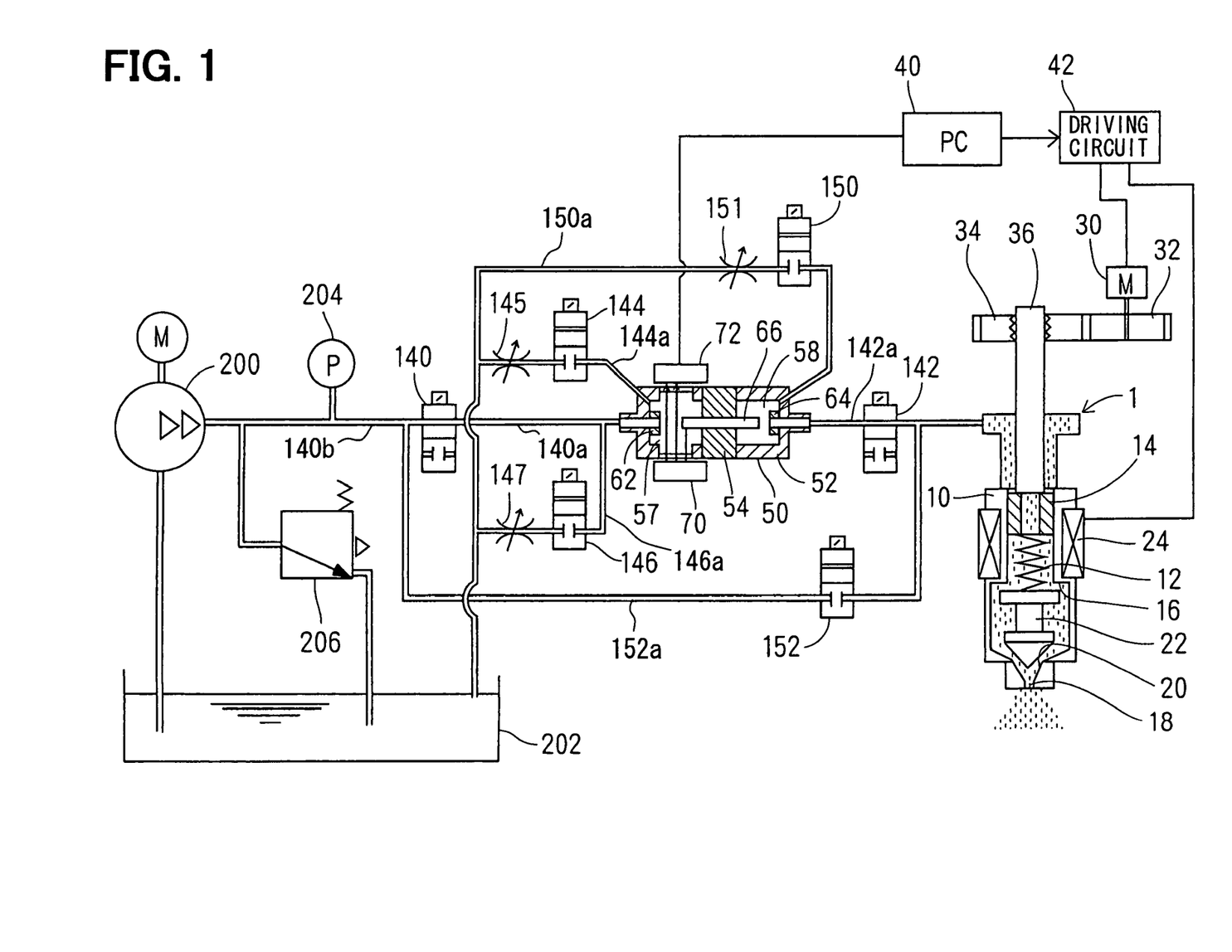
FIG. 1 is a schematic view of a flow amount measuring device according to a first embodiment of the present invention.

A flow amount measuring device shown in FIG. 1 includes a personal computer (hereafter PC) 40, a main measuring body 50, an optical emitter 70, an optical sensor 72, electromagnetic valves 140, 142, 144, 146, 150, 152, and restrictions 145, 147, 151.

The flow amount measuring device is used in a system for measuring a flow amount of fluid injected by a fuel injection valve 1 and adjusting, according to the measurement, a dynamic flow amount required for the fuel injection valve 1, by adjusting a position of an adjusting pipe 14 and a biasing force of a spring 12. In FIG. 1, the fuel injection valve 1 is shown as an operating condition in which it is injecting the fluid.

The dynamic flow amount is an amount of the fuel injected by the fuel injection valve 1 in a stroke, in which an injection port 18 is opened and closed once by a needle 22. The fuel injection valve 1 injects test fluid from the injection port 18 when the needle 22 is lifted up from a valve seat 20. The test fluid is made of noncombustible liquid which has the same viscosity as the fuel in order to avoid flaming. The spring 12 biases the needle 22 toward the valve seat 20, that is, in a direction of closing the injection port 18. The adjusting pipe 14 is press-fitted into a housing 10 of the fuel injection valve 1 and fixed to the housing 10 by, for example, caulking, at the position where the desired dynamic flow amount is achieved. When a coil 24 is supplied with an electric current, a magnetic force is generated to lift up the needle 22 toward a fixed core 16 against the biasing force of the spring 12. Then the needle 22 is separated from the valve seat 20. A maximum lift amount of the needle 22 from the valve seat 20 is defined by the position of the fixed core 16.

A motor gear 32 rotating together with a motor 30 interlocks with a screw gear 34. The screw gear 34 and a feed screw 36 are connected with each other at their threaded surfaces. When the screw gear 34 is rotated, the feed screw 36 moves toward the adjusting pipe 14 or its counter direction. When the feed screw 36 moves toward the adjusting pipe 14, the adjusting pipe 14 is pushed into the housing 10. The PC 40 receives a detection signal from the optical sensor 72 and calculates the dynamic flow amount according to the detection signal, which depends on the current position of the adjusting pipe 14. The PC 40 calculates the position of the adjusting pipe 14 for the next injection timing according to the difference between the calculated dynamic flow amount and a target dynamic flow amount, and adjusts a controlling current from a driving circuit 42 to the motor 30 by controlling the driving circuit 42 according to the calculated position.

A pump 200 pumps up the test fluid from a tank 202 and supplies the test fluid to the fuel injection valve 1. A pressure detector 204 measures the pressure of the test fluid supplied to the fuel injection valve 1. A back-pressure regulating valve 206 adjusts the pressure of the fluid to be supplied to the fuel injection valve 1 to a predetermined pressure. The back-pressure regulating valve 206 may be replaced with a depressurizing valve.

Figure 2:
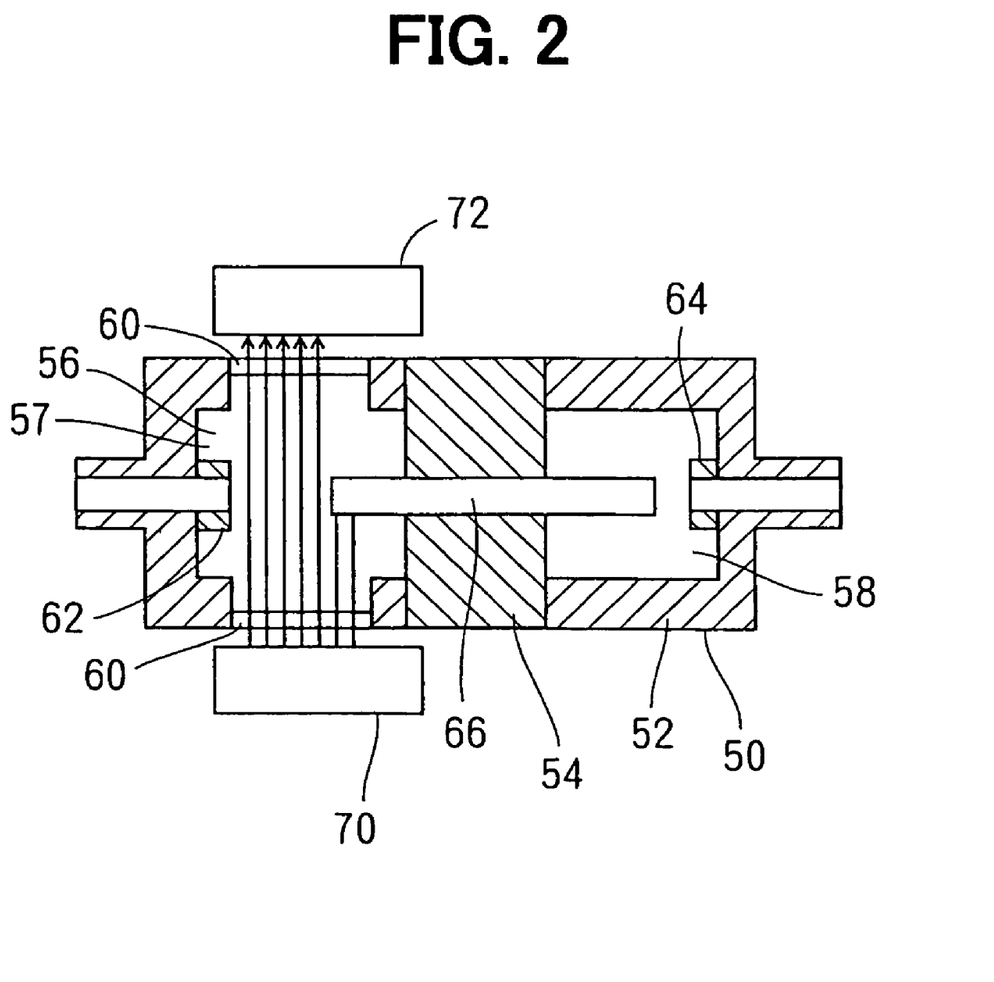
FIG. 2 is an enlarged schematic cross sectional view showing a main body of the flow amount measuring device.

As shown in FIG. 2, the main measuring body 50 includes a housing 52, a partitioning wall 54, stoppers 62 and 64, and a float 66. The housing 52 includes two cylindrical members which sandwich the partitioning wall 54 between them. An inner space 56 defined by the housing 52 is divided by the partitioning wall 54 into a first fluid chamber 57 and a second fluid chamber 58.

The housing 52 includes two optically transparent portions 60, which are located at opposed positions to each other along a direction intersecting with a direction of the movement of the float 66. The optically transparent portions 60 are made of transparent material which transmits light. The stoppers 62 and 64 restrict the movement of the float 66 toward the first fluid chamber 57 and the second fluid chamber 58, by stopping the float 66 when it touches one of the stoppers 62 and 64, respectively.

The float 66 is a generally tubular member having a cavity sealed with the same material, such as stainless, as the partitioning wall 54. The thickness of a tubular wall of the float 66 is adjusted so that the specific gravity of the float 66 including the cavity becomes the same as that of the test fluid. In addition, the float 66 is allowed to slide toward each side of the first fluid chamber 57 and the second fluid chamber 58 through the partitioning wall 54. A supporting portion of the partitioning wall 54, which is a through-hole formed in the partitioning wall, slidably supports the float 66 with a clearance which prohibits leaking of the test fluid from the first fluid chamber 57 to the second fluid chamber 58, and vice versa.

The optical emitter 70 and the optical sensor 72, which operate as a detector, are located at opposite outer sides of the optically transparent portions 60. A parallel light emitted from the optical emitter 70 propagates through the optically transparent portions 60 and the test fluid in the first fluid chamber 57 and is finally received by the optical sensor 72. However, a part of the parallel light is intercepted by the float 66. The optical sensor 72 detects a location of a border between the parallel light and the shade of the float 66 and outputs the detected location to the PC 40 as the detection signal. The detected location indicates the position of the float 66. The end of the float 66 in the first fluid chamber 57 is allowed to move within a range where the optical sensor 72 can detect the location of the border.

Each of the electromagnetic valves 140, 142, 144, 146, 150, and 152 opens and closes respective fluid paths 140a, 140b, 142a, 144a, 146a, 150a, 152a in which the valves are respectively provided. In the first embodiment, in which the flow amount measuring device detects a displacement of the float 66 in one direction, the valve 140 corresponds to a first open/close valve, the valve 142 corresponds to a second open/close valve, the valves 144 and 150 correspond to air vent valves, the valve 146 corresponds to a discharging valve, and the valve 152 corresponds to a third open/close valve.

The valve 140 is provided in the fluid paths 140a and 140b for guiding the test fluid from the source of the fluid (i.e. the pump 200) to the first fluid chamber 57. The valve 142 is provided in the fluid path 142a for guiding the test fluid from the second fluid chamber 58 to the fuel injection valve 1.

Each of the valves 144 and 146 is provided in the respective fluid paths 144a and 146a for opening the first fluid chamber 57 to an external air side. The valve 150 is provided in the fluid path 150a for opening the second fluid chamber 58 to the external air side. The valve 152 is used for supplying the test fluid from the pump 200 to the second fluid chamber 58.

The restriction 145 adjusts the amount of the air and the evaporated test fluid to be discharged from the first fluid chamber 57. The restriction 151 likewise adjusts the amount of the air and the evaporated test fluid to be discharged from the second fluid chamber 58. The restriction 147 adjusts the amount of the test fluid to be discharged from the first fluid chamber 57, when the float 66 is moved to its initial position (the leftmost position in FIG. 1 or 2). The restriction 147 thereby adjusts the time for the float 66 to return to the initial position.

Figure 3:
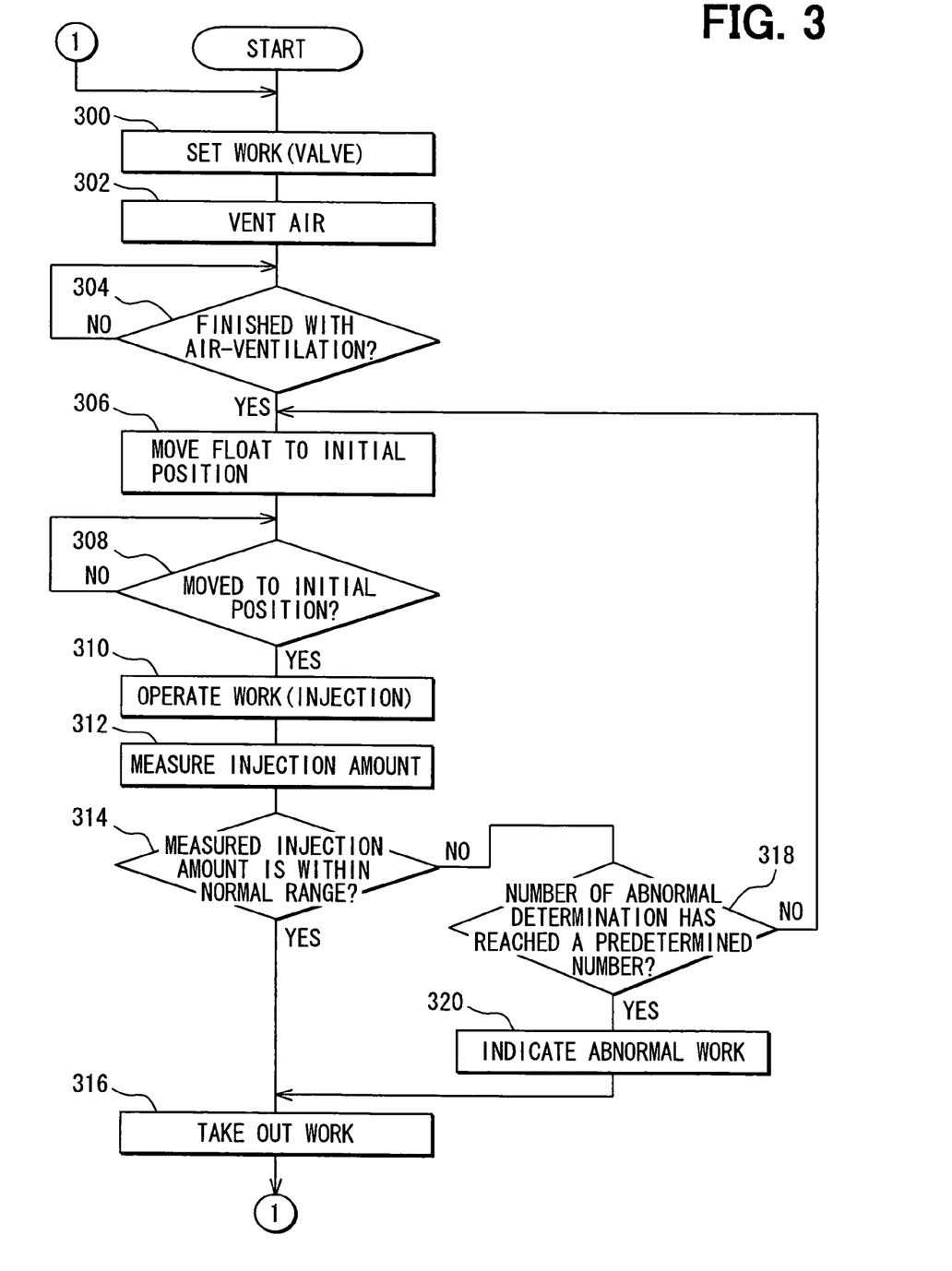
FIG. 3 is a flowchart illustrating a process for measuring the flow amount in the first embodiment.

Hereafter, a description is made to a method for measuring the flow amount of the test fluid by the flow amount measuring device, with reference to FIGS. 1 to 3. The operations of the electromagnetic valves 140, 142, 144, 146, 150, and 152 are controlled by control signals from the PC 40.

(1) Firstly, at a step 300 of FIG. 3, the fuel injection valve 1 is set to the flow amount measuring device, as a work, as shown in FIG. 1. At this step, all of the valves 140, 142, 144, 146, 150, and 152 are closed.

(2) Next at a step 302, the valves 140, 142, 144, 150, and 152 (except for the valve 146) are opened to supply the test fluid from the pump 200 to the first fluid chamber 57 and second fluid chamber 58 and to discharge the air and evaporated test fluid in the chambers 57 and 58 to the external air side.

(3) After a predetermined time period has passed by, and the air and the evaporated test fluid are discharged at a step 304, the valves 140, 144, and 150 are closed and the valve 146 is opened at a step 306. At this step, the valves 142 and 152 are kept opened. Thus, the supply of the test fluid from the pump 200 to the first fluid chamber 57 through the valve 140 is stopped, while the supply of the fluid from the pump 200 to the second fluid chamber 58 through the valves 152 and 142 is continued. As a result, the pressure in the second fluid chamber 58 becomes higher than that in the first fluid chamber 57, and the float 66 moves at the step 306 toward the first fluid chamber 57. The movement of the float 66 discharges the test fluid from the first fluid chamber 57 through the valve 146 and the restriction 147 to the external air side.

(4) When it is detected at a step 308 that the float 66 has returned to the initial position, where the float 66 is brought into contact with the stopper 62, the valves 142, 146, and 152 are closed. The determination of the float 66 returning to the initial position is carried out by the PC 40 according to the detection signal from the optical sensor 72.

(5) Next, the valves 140 and 142 are opened (at a step 310) as shown in FIG. 1. Then the test fluid is supplied from the pump 200 to the first fluid chamber 57 through the valve 140, and the test fluid in the second fluid chamber 58 is supplied to the fuel injection valve 1 through the valve 142. With the valves 140 and 142 opened, the driving circuit 42 outputs at the step 310, under the control of the PC 40, a pulse signal to the coil 24 for driving the fuel injection valve 1 to inject the test fluid by a predetermined number N of times.

When the fuel injection valve 1 carries out one injection, the pressure in the second fluid chamber 58 becomes lower than that in the first fluid chamber 57 by an amount corresponding to the one injection. Therefore, the float 66 moves toward the second fluid chamber 58.

Provided that "S" is the cross section of the float 66, "t" is the amount of the movement of the float 66 relative to the initial position, and "Q" is the amount of the test fluid injected by the one injection, the pressure difference between the first fluid chamber 57 and the second fluid chamber 58 is canceled and then the float 66 stops, when the float 66 moves by "t" which satisfies the equation $Q=S \times t$. Therefore, when the fuel injection valve 1 carries out the predetermined number N of the injections, the float 66 moves by "t" which satisfies the equation $\Sigma Q=S \times t$, wherein the $\Sigma Q$ is a total sum of the test fluid injected by the fuel injection valve 1 for the predetermined number N of injections.

(6) After the fuel injection valve 1 has carried out the predetermined number N of injections, the valves 140 and 142 are closed. Then, according to the detection signal from the optical sensor 72 indicating the total amount of the movement t of the float 66, the PC 40 calculates at a step 312 the value $S \times t/N$, which is equal to $\Sigma Q/N$; the amount of injected test fluid for one injection. The PC 40 may store the value of the cross section "S" beforehand and use the stored value in the calculation.

(7) Next at a step 314, the PC 40 determines whether the calculated injected amount of the one injection is within a normal range. Alternatively, the PC 40 may determine whether the amount of the movement of the float 66 for one injection is within a normal range. If the determination is YES (normal), the fuel injection valve 1 is removed from the flow amount measuring device at a step 316 and the process goes back to the step 300 for another fuel injection valve.

If the determination of the step 314 is NO (abnormal) and number of the past determinations of the abnormality reaches a predetermined number K at a step 318, the PC 40 notifies a user of the abnormality of the fuel injection valve at a step 320. In the case that the number of the past determinations of the abnormality is less than the predetermined number K, the process goes back to the step 306 and the above mentioned measurement is repeated.

Second Embodiment

Figure 4:
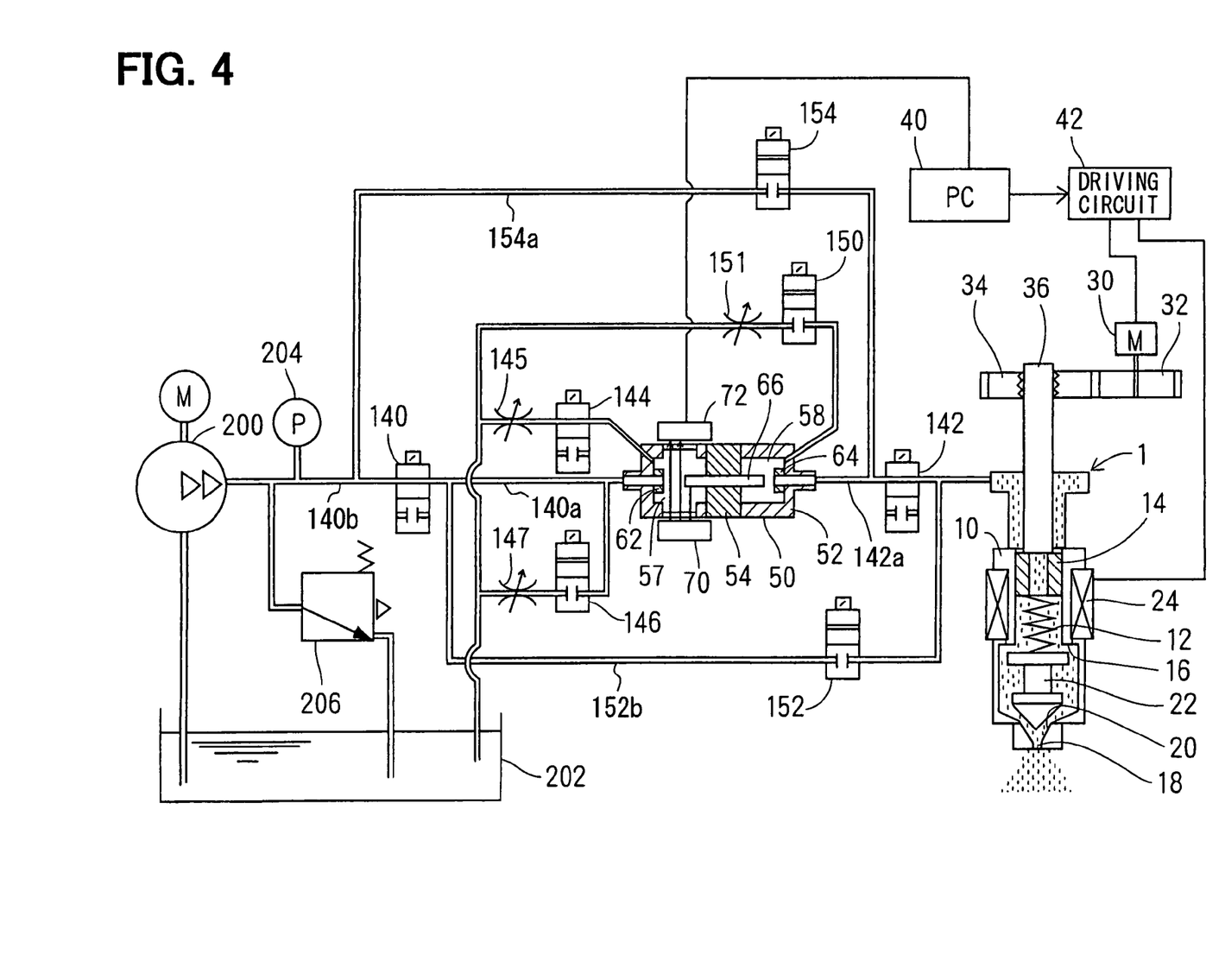
FIG. 4 is a schematic view of a flow amount measuring device according to a second embodiment of the present invention.
Figure 5:
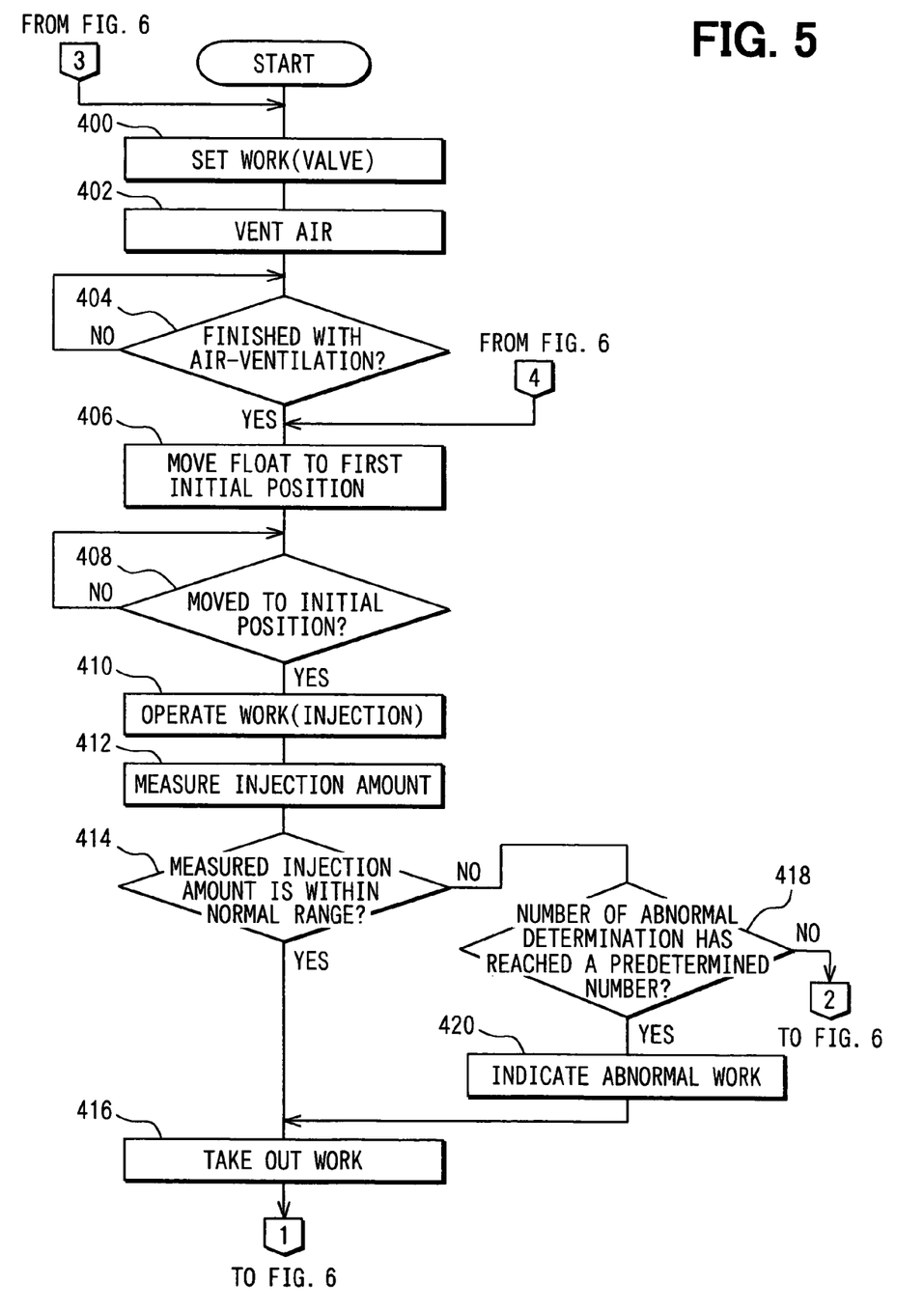
FIG. 5 is a flowchart illustrating a first part of a process for measuring the flow amount in the second embodiment.
Figure 6:
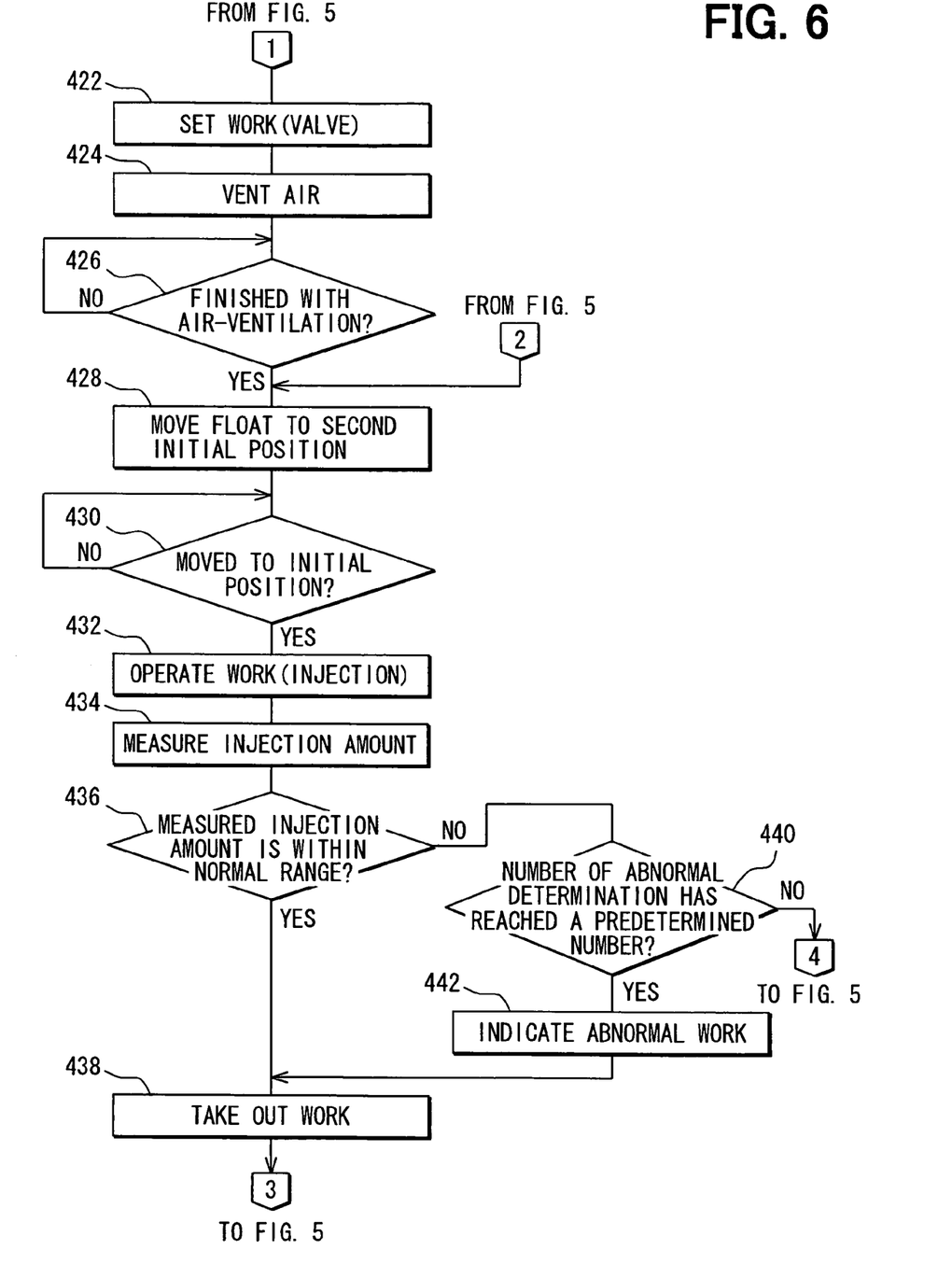
FIG. 6 is a flowchart illustrating a second part of the process for measuring the flow amount in the second embodiment.

Hereafter, a description is made to a flow amount measuring device and a method of measuring the flow amount of the second embodiment, with reference to FIGS. 4 to 6.

The structure of the flow amount measuring device of the second embodiment differs from the first embodiment in two points as seen from FIG. 4. The first point is that an upstream end of a fluid path 152b of the second embodiment, in which the valve 152 is provided, bifurcates from a juncture of the fluid path 140a between the valve 140 and the first fluid chamber 57, whereas the upstream end of the fluid path 152a of the first embodiment bifurcates from a juncture of the fluid path 140b between the pump 200 and the valve 140. The second point is that an electromagnetic valve 154 is provided in a fluid path 154a which bifurcates from a juncture of the fluid path 140b between the pump 200 and the valve 140 and is connected with a juncture of the fluid path 142a between the valve 142 and the second fluid chamber 58.

The operation of the flow amount measuring device of the second embodiment differs from the first embodiment in that the flow amount is measured by the movements of the float 66 in both directions, namely the movement not only from the first fluid chamber 57 to the second fluid chamber 58 but also from the second fluid chamber 58 to the first fluid chamber 57, whereas the flow amount is measured by the movement of the float 66 only in one direction, namely from the first to the second fluid chamber, according to the first embodiment.

In the flow amount measuring device of the second embodiment, in which the movement of the float 66 is detected in both directions, the valve 140 corresponds to the first open/close valve, the valve 142 corresponds to the second open/close valve, the valves 144 and 150 correspond to the air vent valves, the valve 154 corresponds to the third open/close valve, and the valve 152 corresponds to a fourth valve.

Hereafter, a description is made to a method for measuring the flow amount of the test fluid in the second embodiment.

(1) Firstly, at a step 400 of FIG. 5, the fuel injection valve 1 as a work is set to the flow amount measuring device as shown in FIG. 4. At this step, all of the valves 140, 142, 144, 146, 150, 152, and 154 are closed.

(2) Next at a step 402, the valves 140, 144, 150, and 154 are opened to supply the test fluid from the pump 200 to the first fluid chamber 57 and second fluid chamber 58, and to discharge the air and the evaporated test fluid from the first and second fluid chambers 57 and 58 to the external air side.

(3) After a predetermined time period has passed by, and the air and the evaporated test fluid are discharged at a step 404, the valves 144, 150, and 154 are closed and the valves 142, 146, and 152 are opened at a step 406. At this step, the valve 140 is kept opened. Thus, the test fluid is supplied from the pump 200 to the second fluid chamber 58 through the valves 140, 152, and 142. In addition, the test fluid is discharged from the first fluid chamber 57 to the external air side through the valve 146 and the restriction 147. As a result, the pressure in the second fluid chamber 58 becomes higher than that in the first fluid chamber 57, and therefore the float 66 moves toward the first fluid chamber 57 at the step 406.

(4) When it is detected at a step 408 that the float 66 has moved to the stopper 62 and stopped at a first initial position, the valves 140, 142, 146, and 152 are closed. At this step, the determination of the float 66 returning to the first initial position is carried out by the PC 40 according to the detection signal from the optical sensor 72.

(5) Next, the valves 140 and 142 are opened (at a step 410), as shown in FIG. 4, in the same way described in (5) of the first embodiment. Namely, the test fluid is supplied from the pump 200 to the first fluid chamber 57 through the first valve 140, whereas the test fluid in the second fluid chamber 58 is supplied to the fuel injection valve through the second valve 142. With the valves 140 and 142 opened, the driving circuit 42 outputs at the step 410, under the control of the PC 40, a pulse signal to the coil 24 for driving the fuel injection valve 1 to inject the test fluid by the predetermined number N of times.

As described in the first embodiment, the injection by the fuel injection valve 1 makes the pressure in the second fluid chamber 58 lower than that in the first fluid chamber 57 by an amount corresponding to the injection. Therefore, the float 66 moves toward the second fluid chamber 58.

(6) After the fuel injection valve 1 has carried out the predetermined number N of injections, the valves 140 and 142 are closed. Then, according to the detection signal from the optical sensor 72 indicating the total amount of the movement t of the float 66, the PC 40 calculates at a step 412 the value S×t/N, which is equal to ΣQ/N; the amount of injected test fluid for one injection.

(7) Operations in steps 414, 416, 418, and 420 are the same as those in the steps 314, 316, 318, and 320 described in (7) of the first embodiment. Namely, the PC 40 determines at the step 414 whether the calculated injection amount or the amount of the float movement for one injection is within the normal range. In the case that it is within the normal range, the fuel injection valve 1 is taken out from the measuring device at the step 416 and the process goes to the step 422 of FIG. 6.

In the case that the calculated amount is out of the normal range (at the step 414) and the number of previous determination of the abnormality reaches the predetermined number (at the step 418), an indication for the abnormality is made at the step 420.

In the case that the number of the previous determination for the abnormality is less than the predetermined number, the process goes to the step 428 of FIG. 6, to repeat the measurement of the injection amount.

(8) At the step 422 of FIG. 6, another fuel injection valve 1 is attached to the flow amount measuring device. Subsequently at steps 424 and 426, the air and the evaporated test fluid in the first and second fluid chambers 57 and 58 are discharged to the external air side in the same manner to the steps 402 and 404.

(9) At the step 428, the valves 140 and 150 are opened and the test fluid is supplied from the pump 200 to the first fluid chamber 57 through the valve 140. As a result, the pressure in the first fluid chamber 57 becomes higher than that in the second fluid chamber 58, and the float 66 moves toward the second fluid chamber 58. The movement of the float 66 discharges the test fluid in the second fluid chamber 58 to the external air side through the valve 150 and the restriction 151.

(10) When it is detected at a step 430 that the float 66 has moved to the stopper 64 and stopped at a second initial position, the valves 140 and 150 are closed. At this step, the determination of the float 66 returning to the second initial position is carried out by the PC 40 according to the detection signal from the optical sensor 72.

(11) Next, the valves 152 and 154 are opened and the test fluid is supplied from the pump 200 to the second fluid chamber 58 through the valve 154. Then, the test fluid is supplied from the first fluid chamber 57 to the fuel injection valve 1 through the valve 152. With the valves 152 and 154 opened, the driving circuit 42 outputs at a step 432, under the control of the PC 40, a pulse signal to the coil 24 for driving the fuel injection valve 1 to inject the test fluid by the predetermined number N of times.

(12) After the fuel injection valve 1 has carried out the predetermined number N of injections, the valves 152 and 154 are closed. Then, according to the detection signal from the optical sensor 72 indicating the total amount of the movement t of the float 66, the PC 40 calculates at a step 434 the value S×t/N, which is equal to ΣQ/N; the amount of injected test fluid for one injection.

(13) Operations in steps 436, 438, 440, and 442 are the same as those in the steps 314, 316, 318, and 320 described in (7) of the first embodiment. Namely, the PC 40 determines at the step 436 whether the calculated injection amount or the amount of the float movement for one injection is within the normal range. In the case that it is within the normal range, the fuel injection valve 1 is taken out from the measuring device at the step 438 and the process goes to the step 400 of FIG. 5.

In the case that the calculated amount is out of the normal range (at the step 436) and the number of previous determination of the abnormality reaches the predetermined number at the step 440, the indication for the abnormality is made at the step 442. The process goes to the step 438, at which the fuel injection valve 1 is taken out from the measuring device. And the process goes back to the step 400 of FIG. 5.

In the case that the number of the past determination of the abnormality is less than the predetermined number, the process goes to the step 406 of FIG. 5.

In the above second embodiment, the valves 140 and 150 are opened to move the float 66 to the second initial position. However, the float 66 may be moved to the second initial position by opening the valves 140 and 142 and making the fuel injection valve 1 inject the test fluid.

Third Embodiment

Figure 7:
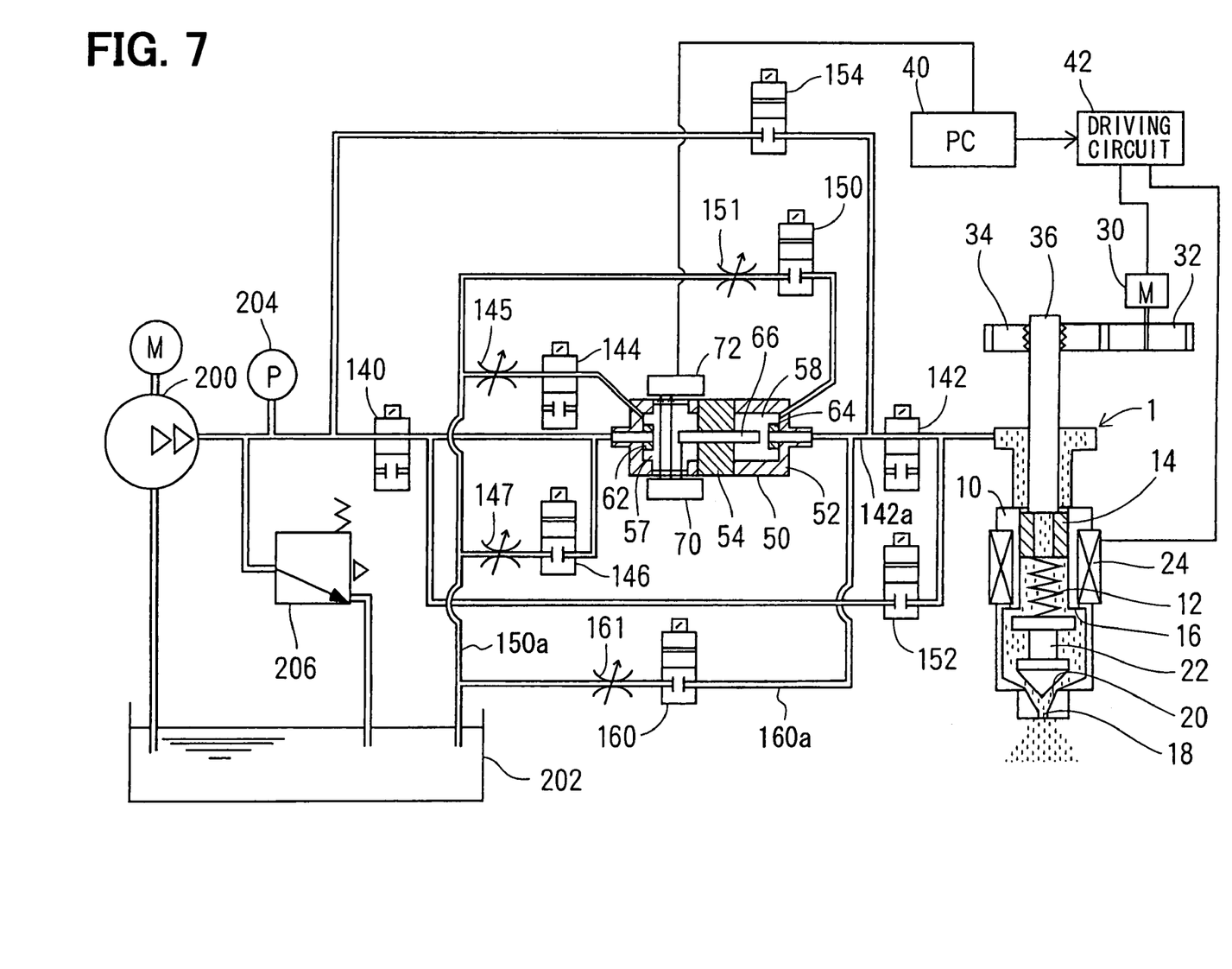
FIG. 7 is a schematic view of a flow amount measuring device according to a third embodiment of the present invention.

As shown in FIG. 7, the third embodiment of the present invention differs from the second embodiment in two points. The first point is that the flow amount measuring device of the third embodiment further includes a fluid path 160a connected between the fluid paths 142a and 150a, an electromagnetic valve 160 and a restriction 161 provided in the fluid path 160a. The second point is that the float 66 moves to the second initial point when the valves 140 and 160 are opened. Namely, when the valves 140 and 160 are opened, the test fluid is supplied from the pump 200 to the first fluid chamber 57 through the valve 140 and the test fluid in the second fluid chamber 58 is discharged to the external air side through the fluid path 160a, the valve 160 and the restriction 161. Therefore, the float 66 moves to the second initial position.

Fourth Embodiment

Figure 8:
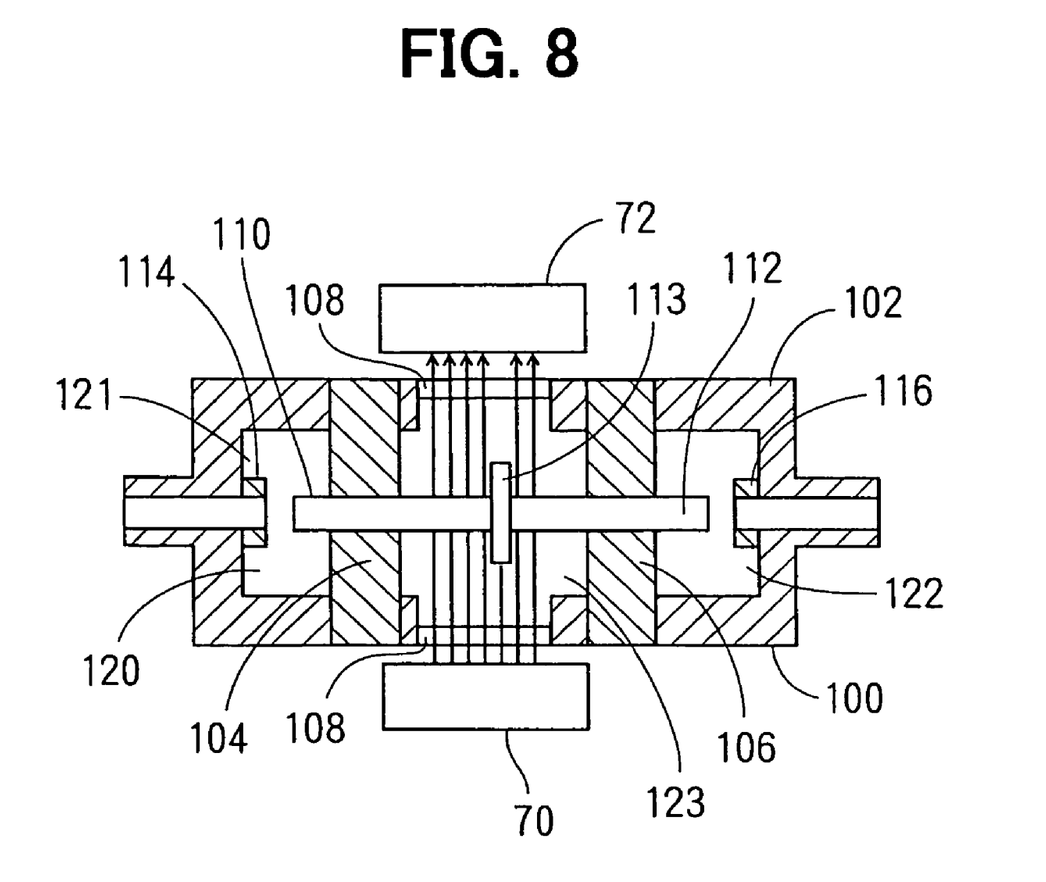
FIG. 8 is an enlarged schematic cross sectional view of a main body of a flow amount measuring device according to a fourth embodiment of the present invention.

The fourth embodiment of the present invention differs from the first to the third embodiments in that the main measuring body 50 is replaced with a main measuring body 100 shown in FIG. 8.

The main measuring body 100 has a housing 102, partitioning walls 104 and 106, a float 110, and a first and a second stoppers 114 and 116. The housing 102 includes three cylindrical members, respectively holing the partitioning walls 104 and 106 by and between the two neighboring cylindrical members. An inner space 120 defined by the housing 102 is divided by the partitioning walls 104 and 106 into three chambers. The three chambers consist of a first fluid chamber 121, a second fluid chamber 122, and a third fluid chamber 123, which is formed between the first and second fluid chambers 121 and 122.

The float 110 includes a hollow tubular member 112 and a disk-like member 113 which is attached to the center of the member 112 along the axial direction of the member 112. The member 112 has a cavity sealed with the same material, such as stainless, as the partitioning walls 104 and 106, and is supported at its both ends by through-holes respectively formed in the partitioning walls 104 and 106, and allowed to slide through the partitioning walls 104 and 106. The wall thickness of the hollow tubular member 112 is designed so that the specific gravity of the float 110 including the cavity and the disk-like member 113 becomes the same as that of the test fluid.

The partitioning walls 104 and 106 respectively support the float 110 with clearances which prohibit leaking of the test fluid from the first to the third fluid chamber (121, 123) and from the second to the third fluid chamber (122, 123). The disk-like member 113 is disposed in the third fluid chamber 123.

The housing 102 includes optically transparent portions 108, which cover the third fluid chamber 123 and are located at opposed positions to each other along a direction intersecting with a direction of the movement of the float 110. The optically transparent portions 108 are made of transparent material transmitting light. The stoppers 114 and 116 respectively restrict the movement of the float 110 toward the first fluid chamber 121 and the second fluid chamber 122, by stopping the float 110 when either end of the float 110 is brought into contact with one of the stoppers 114 and 116.

The optical emitter 70 and the optical sensor 72 are made of the same material and have the same function with the optical emitter 70 and the optical sensor 72 of the first to the third embodiments.

The optical emitter 70 and the optical sensor 72 of the fourth embodiment are located at opposite outer sides of the optically transparent portions 108. A parallel light emitted from the optical emitter 70 propagates through the optically transparent portions 108 and the test fluid in the third fluid chamber 123 and is finally received by the optical sensor 72. However, a part of the parallel light is intercepted by the disk-like member 113. The optical sensor 72 detects a location of a border between the parallel light and the shade of the disk-like member 113 and outputs the detected location to the PC 40 as the detection signal. The detected location indicates the position of the float 110. The disk-like member 113 in the third fluid chamber 123 is allowed to move within a range where the optical sensor 72 can detect the location of the border.

As described above, the float 110 is supported at its both ends by the partitioning walls 104 and 106. Therefore, tilting of the float 110 is restricted.

According to the above first to fourth embodiments, the sealed inner space of the housing is divided into at least the first fluid chamber and the second fluid chamber by the partitioning wall(s). The partitioning wall(s) supports the float formed as the hollow tubular member for allowing the float to move to the first fluid chamber or the second fluid chamber through the partitioning wall(s). In addition, the test fluid is supplied to one of the fluid chambers and the test fluid is supplied from the other fluid chamber to the fuel injection valve. Then, the injection of the test fluid by the fuel injection valve generates the pressure difference between the fluid chambers, which moves the float. The float stops when it moves by a distance corresponding to the amount of the injected fluid. Therefore, it is possible to precisely measure the amount of the test fluid injected by the fuel injection valve according to the amount of the movement and the cross section of the float.

In addition, in the flow amount measuring device of the above embodiments, the pressure difference between the first and second fluid chambers is canceled when the float is moved by the pressure difference. Therefore, a pressure pulsation does not occur in the flow amount measuring device. As a result, an unwanted displacement of the float due to the pulsation does not occur, which makes it possible to detect the position of the float and measure the flow amount of the injected fluid with a high degree of accuracy.

Thus, since the float moves in conjunction with the every injection by the fuel injection valve, the flow amount of the injected fluid is measured with a high degree even with a small number of the injections. Therefore, it is possible to measure the flow amount in a short time.

In addition, it is possible to calculate the flow amount of the fluid injected for one injection from the movement rate of the float through a plurality of injections, because the float is moved for each fluid injection.

In addition, since the float is brought back to the initial position before each measuring process, a moving area for the float is made smaller than that in the case where the float is not brought back to the initial position. Therefore, the flow amount measuring device can be constructed to be smaller.

In addition, since the housing covers the sealed inner space in which the float is interposed, it is easy to construct the flow amount measuring device so as to prevent the test fluid from leaking from the housing.

In addition, since the thickness of the sealed hollow tubular float can be adjusted so that the specific gravity of the float including its cavity becomes the same as that of the test fluid, the float does not elevate or sink in the test fluid and therefore moves smoothly.

In addition, since the supporting portion(s) (through-hole (s)) of the partitioning wall(s) for supporting the float is made of the same material as the float, coefficient of volume expansion of the supporting portion is identical to that of the float. Therefore, the change of the clearance between the supporting portion and the float is suppressed even with a temperature change.

Other Embodiments

The optical emitter 70 and the optical sensor 72 in the above embodiments can be replaced with any other position detector which is capable of detecting the amount of the movement of the float.

In addition, the float can be made of any other material than the stainless and/or can be formed as a solid member rather than the hollow member, so that the specific gravity of the float becomes the same to that of the test fluid.

Moreover, the float may have different specific gravity from the test fluid. In addition, the float and the supporting portion of the partitioning wall can be made of different materials.

In addition, the float may be brought back to the initial position for every multiple measurements, instead of each measurement.

Each end of the hollow tubular member 112 (the float 110) respectively projects from the partitioning walls 104 and 106 into the first fluid chamber and second fluid chambers 121 and 122, in the fourth embodiment. However, the tubular member 112 may be made shorter and either one end or both ends may be accommodated in the supporting portions (the through-holes) of the partitioning walls 104 and 106, depending on the position of the float 110. Furthermore, both ends may be accommodated in the supporting portions of the partitioning walls 104 and 106, irrespective of the position of the float 110.

What is claimed is:

1. A flow amount measuring device for measuring a flow amount of injection fluid injected by a fluid injection valve, comprising:
   a housing for defining an inner space connected with a fluid path for guiding the injection fluid from a source of the injection fluid to the fluid injection valve, the inner space being divided into a first fluid chamber and a second fluid chamber, wherein the first and second fluid chambers are operatively connected with each other so that when the injection fluid is supplied from the source of the injection fluid into the first fluid chamber, the injection fluid of the second fluid chamber is supplied to the fluid injection valve; a partitioning wall for dividing the inner space into the first and second fluid chambers;
   a movable member movably arranged in the partitioning wall for moving through the partitioning wall to both of the first and second fluid chambers according to pressure difference between the first and second fluid chambers; and
   a detector for detecting an amount of the movement of the movable member,
   wherein the movable member has a sealed cavity so that specific gravity of the movable member is substantially the same as that of the injection fluid.

2. The flow amount measuring device according to claim 1, wherein the partitioning wall includes a supporting portion for movably supporting the movable member, and
   the supporting portion is made of the same material as the movable member.

3. The flow amount measuring device according to claim 1, wherein:
   the housing includes a pair of optically transparent portions which are arranged at opposed positions to each other in a direction intersecting with a direction of the movement of the movable member;
   the detector includes: an optical emitter provided at an outer side of one of the optically transparent portions; and an optical sensor provided at an other outer side of the other optically transparent portion, so that the optical emitter and the optical sensor are opposing to each other, and the optical sensor receives the light from the optical emitter; and the movable member moves in such a manner of blocking the light from the optical emitter to the optical sensor.

4. The flow amount measuring device according to claim 1, further comprising:
   a first open/close valve for opening and closing a fluid path for supplying the injection fluid from the source to the first fluid chamber; and a second open/close valve for opening and closing a fluid path for supplying the injection fluid from the second fluid chamber to the fluid injection valve;
   a third open/close valve for opening and closing a fluid path for supplying the injection fluid from the source to the second fluid chamber; and
   a fourth open/close valve for opening and closing a fluid path for supplying the injection fluid from the first fluid chamber to the fluid injection valve.

5. The flow amount measuring device according to claim 1, further comprising an air vent valve for discharging air from the fluid chambers.

6. The flow amount measuring device according to claim 1, further comprising:
   a first open/close valve for opening and closing a fluid path for supplying the injection fluid from the source to the first fluid chamber; and a second open/close valve for opening and closing a fluid path for supplying the injection fluid from the second fluid chamber to the fluid injection valve.

7. The flow amount measuring device according to claim 6, further comprising:
   a third open/close valve for opening and closing a fluid path for supplying the injection fluid from the source to the second fluid chamber; and a discharging valve for opening and closing a fluid path for discharging the injection fluid from the first fluid chamber to an external air side.

8. In a flow amount measuring device for measuring a flow amount of injection fluid injected by a fluid injection valve, which comprises:
   a housing for defining an inner space connected with a fluid path for guiding the injection fluid from a source of the injection fluid to the fluid injection valve, the inner space being divided into a first fluid chamber and a second fluid chamber, wherein the first and second fluid chambers are operatively connected with each other so that when the injection fluid is supplied from the source of the injection fluid into the first fluid chamber, the injection fluid of the second fluid chamber is supplied to the fluid injection valve; a partitioning wall for dividing the inner space into the first and second fluid chambers; and a movable member movably arranged in the partitioning wall for moving through the partitioning wall to both of the first and second fluid chambers according to pressure difference between the first and second fluid chambers, wherein the movable member has a sealed cavity so that specific gravity of the movable member is substantially the same as that of the injection fluid; and a method for measuring the flow amount comprising a step for: measuring the flow amount of the injection fluid based on an amount of the movement of the movable member, wherein the movement of the movable member varies in accordance with a fluid amount injected from the fluid injection valve.

9. The method according to claim 8, further comprising a step for discharging air from the fluid chambers to an external air side each time before the measuring step.

10. The method according to claim 8, wherein the step for measuring flow amount is carried out based on the amount of the movement of the movable member, and the movable member moves in a direction from the first fluid chamber to the second fluid chamber.

11. The method according to claim 10, further comprising a step for moving the movable member in a direction from the second fluid chamber to the first fluid chamber, so that the movable member moves to its initial position before the measuring step.

12. The method according to claim 8, wherein the step for measuring the flow amount is carried out based on the amount of the movement of the movable member, and the movable member alternately moves in a direction from the first to the second fluid chamber and in a direction from the second to the first fluid chamber, for each measuring step.

13. The method according to claim 12, further comprising a step for moving the movable member in one of the directions, so that the movable member moves to its initial position in the corresponding fluid chamber before the measuring step, wherein the direction of the movable member in the moving step is the same to a direction of the movement of the movable member in the measuring step right before the moving step.

14. A flow amount measuring device for measuring a flow amount of injection fluid injected by a fluid injection valve, comprising:
  a pump for pumping out the injection fluid from a tank;
  a fluid path for connecting the pump with the fluid injection valve; and
  a main valve body provided in the fluid path, wherein the main valve body comprises;
  i) a valve housing defining an inner space;
  ii) a partitioning wall for dividing the inner space into a first and a second fluid chamber, so that the first fluid chamber is operatively connected to the pump and the second fluid chamber is operatively connected to the fluid injection valve;
  iii) a movable member movably accommodated in a through hole formed in the partitioning wall, wherein the movable member moves in both directions toward the first and second fluid chambers in accordance with pressure difference between the first and second fluid chambers, wherein specific gravity of the movable member is substantially the same as that of the injection fluid; and
  iv) a detector for detecting an amount of the movement of the movable member; a first open/close valve provided in the fluid path between the pump and the first fluid chamber; and
  a second open/close valve provided in the fluid path between the second fluid chamber and the fluid injection valve, wherein fluid pressure of the injection fluid pumped out from the pump is applied to the first open/close valve, so that the pressure difference is generated between the first and second fluid chambers when the first and second open/close valves are opened and the injection fluid is injected from the fluid injection valve.

* * * * *